US008529107B2

(12) United States Patent
Moran et al.

(10) Patent No.: US 8,529,107 B2
(45) Date of Patent: Sep. 10, 2013

(54) SYSTEM FOR USE IN ILLUMINATION OF RAILWAY FEATURE

(75) Inventors: Henry Andrew Moran, Marcellus, NY (US); Milton Brill, Harahan, LA (US); Danny Thomas Forster, Syracuse, NY (US)

(73) Assignee: Tripsplusone, Inc., Syracuse, NY (US)

( * ) Notice: Subject to any disclaimer, the term of this patent is extended or adjusted under 35 U.S.C. 154(b) by 334 days.

(21) Appl. No.: 12/764,597

(22) Filed: Apr. 21, 2010

(65) Prior Publication Data

US 2011/0261558 A1 Oct. 27, 2011

(51) Int. Cl.
*B60Q 1/00* (2006.01)
*B61L 29/24* (2006.01)

(52) U.S. Cl.
USPC ........... 362/478; 362/183; 362/476; 246/474; 246/473.3

(58) Field of Classification Search
USPC .............. 246/473.3, 417, 477, 474; 362/145, 362/183, 478
See application file for complete search history.

(56) References Cited

U.S. PATENT DOCUMENTS

| | | | | |
|---|---|---|---|---|
| 1,837,184 | A | 12/1931 | Drillette | |
| 3,085,238 | A | 4/1963 | Lewis | |
| 3,544,960 | A | 12/1970 | Hayes | |
| 4,654,629 | A | 3/1987 | Bezos et al. | |
| 4,754,272 | A | 6/1988 | Illenberg et al. | |
| D304,694 | S | 11/1989 | Goss | |
| 4,942,395 | A | 7/1990 | Ferrari et al. | |
| 5,680,033 | A | 10/1997 | Cha | |
| 5,735,492 | A | 4/1998 | Pace | |
| 5,791,605 | A | 8/1998 | Howie, II | |
| 5,839,816 | A | 11/1998 | Varga et al. | |
| 5,954,299 | A | 9/1999 | Pace | |
| 6,013,985 | A | 1/2000 | Green et al. | |
| 6,435,459 | B1 | 8/2002 | Sanderson et al. | |
| 6,573,659 | B2 | 6/2003 | Toma et al. | |
| 6,602,021 | B1 * | 8/2003 | Kim | 404/16 |
| 7,018,131 | B2 * | 3/2006 | Jordan | 404/16 |
| 7,075,427 | B1 | 7/2006 | Pace et al. | |
| 7,154,403 | B2 | 12/2006 | Davenport et al. | |
| 7,158,020 | B2 | 1/2007 | Grady, Jr. | |
| 7,300,165 | B2 | 11/2007 | Garcia | |
| 2005/0270175 | A1 | 12/2005 | Peddie et al. | |
| 2009/0174542 | A1 | 7/2009 | Gentry et al. | |
| 2009/0256723 | A1 | 10/2009 | Peddie et al. | |

FOREIGN PATENT DOCUMENTS

| | | | |
|---|---|---|---|
| JP | 02037070 A | | 2/1990 |
| JP | 2011084990 A | * | 4/2011 |

OTHER PUBLICATIONS

Ninghai Qinghua Electrical Co. Ltd, Solar Light, http://nhqhq.en.ec21.com/Solar_light--2231868_2185968.html, 1 page, printed on Mar. 21, 2010.

Ninghai Qinghua Electrical Co. Ltd, Solar Road Light, http://www.ecplaza.net/tradeleads/seller/5151008/solar_road_light.html, 1 page, printed on Mar. 21, 2010.

(Continued)

*Primary Examiner* — Robert May
(74) *Attorney, Agent, or Firm* — Heslin Rothenberg Farley & Mesiti, PC

(57) ABSTRACT

There is provided a system for use in illuminating a feature of a railway. In one embodiment, a system can include an illumination unit disposed for illumination of a railway feature. The illumination unit can include a light source bank, a solar panel, and a rechargeable battery for energizing the light source bank that is rechargeable utilizing energy collected by the solar energy panel.

36 Claims, 11 Drawing Sheets

(56) References Cited

OTHER PUBLICATIONS

Ninghai Qinghua Electrical Co. Ltd, Solar Road Stud—QH-011D and Solar Road Stud—QH-12D, 1 page, published based on information and belief at least as early as Mar. 22, 2010.

Apr. 3, 2013 Notice of Recordation of Assignment recorded on Aug. 2, 2013 at Reel 030931, Frame 0090 (with executed Assignment document).

Apr. 3, 2013 Notice of Recordation of Assignment recorded on Aug. 2, 2013 at Reel 030935, Frame 0306 (with executed Assignment document).

* cited by examiner

SYSTEM FOR USE IN ILLUMINATION OF RAILWAY FEATURE

FIELD OF THE INVENTION

The present invention relates to railways in general and in particular to a system for use in illumination of a feature of a railway.

BACKGROUND OF THE PRIOR ART

Railways can comprise a series of interconnected railroad tracks. Railroad tracks typically comprise a system of railroad ties and rails. Railroad ties can be aligned in generally parallel relation to one another and can be spaced to nominal center-line spacing distance of about 53.34 cm (21.00 in.). Railroad tracks can be disposed above a series of ties. A length of railroad track can include a pair of spaced apart rails disposed in perpendicular (transverse) relation to a series of railroad ties. Railroad ties in one embodiment can comprise treated timber, and rails can comprise steel. A railway can include a switch. A switch can include a switchstand (a points lever assembly) and a set of switch rails. Within an area of a switch, railroad ties can be extended substantially outward from a rail. A switchstand for controlling a position of a switch can be disposed on a railroad tie extending beyond a normal distance from a rail. For maintenance of a railway, maintenance personnel typically carry flashlights into the field. In the maintenance of railways, injuries have been observed. For example, maintenance personnel have been observed to be injured by railway features including a switchstand in the process of servicing a railway. Locations of interest of current railways are either not marked or are poorly marked. A switchstand can include a directional indicator often painted with red and/or green paint. A foul point is often indicated with a yellow painted tie and rail at a location of the foul point. A derail point is sometimes marked with a small sign with the word "DERAIL" carried thereon.

SUMMARY OF THE INVENTION

There is provided a system for use in illuminating a feature of a railway. In one embodiment, a system can include an illumination unit disposed for illumination of a railway feature. The illumination unit can include a light source bank, a solar panel, and a rechargeable battery for energizing the light source bank that is rechargeable utilizing energy collected by the solar energy panel.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. However, the scale depicted in the drawings does depict the relative scale of various system components in one particular embodiment. In the drawings, wherein like numerals are used to indicate like parts throughout the various views.

DETAILED DESCRIPTION OF THE INVENTION

Figure 1:
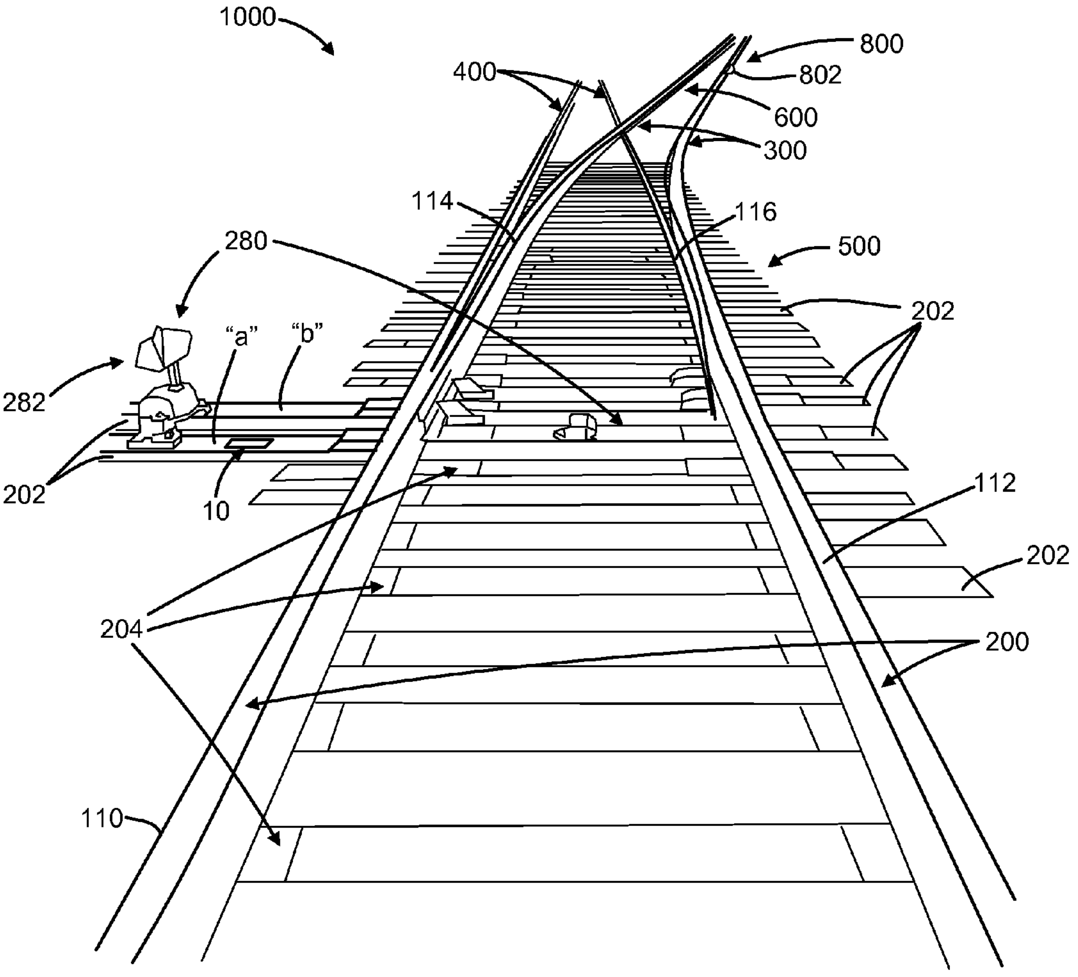
FIG. 1 is a perspective view of an illumination system for illumination of a feature of a railway.

Referring to FIGS. 1-13, there is set forth herein a system 1000 for illumination of a railway feature. System 1000 can include an illumination unit 10 which can be specifically located and featurized as will be set forth herein. By illumination of a railway feature, a risk of injury posed by a railway feature can be substantially reduced. A railway feature can be e.g., a location of interest, e.g., a switch, or a plurality of locations of interest.

Referring to illumination unit 10, illumination unit 10 in one embodiment can include a solar panel 30 for collection of solar energy and a light source bank 20. Light source bank 20 can include a plurality of light sources as shown in the embodiment of FIGS. 1-13 or can include a single light source. Illumination unit 10 can include a rechargeable battery 40 as will be set forth herein and can be operative to be recharged utilizing solar energy collected from solar panel 30. Illumination unit 10 can be operative so that during periods without sunlight, light source bank 20 can be energized for illumination of a railway feature. Illumination unit 10 can be a self-contained unit and can include a housing 60 for housing light sources of light source bank 20 and additional components making up illumination unit 10. In one embodiment, illumination unit 10 can comprise dimensions (l×w×h) of about 11 cm×8 cm×3 cm.

Figure 2:
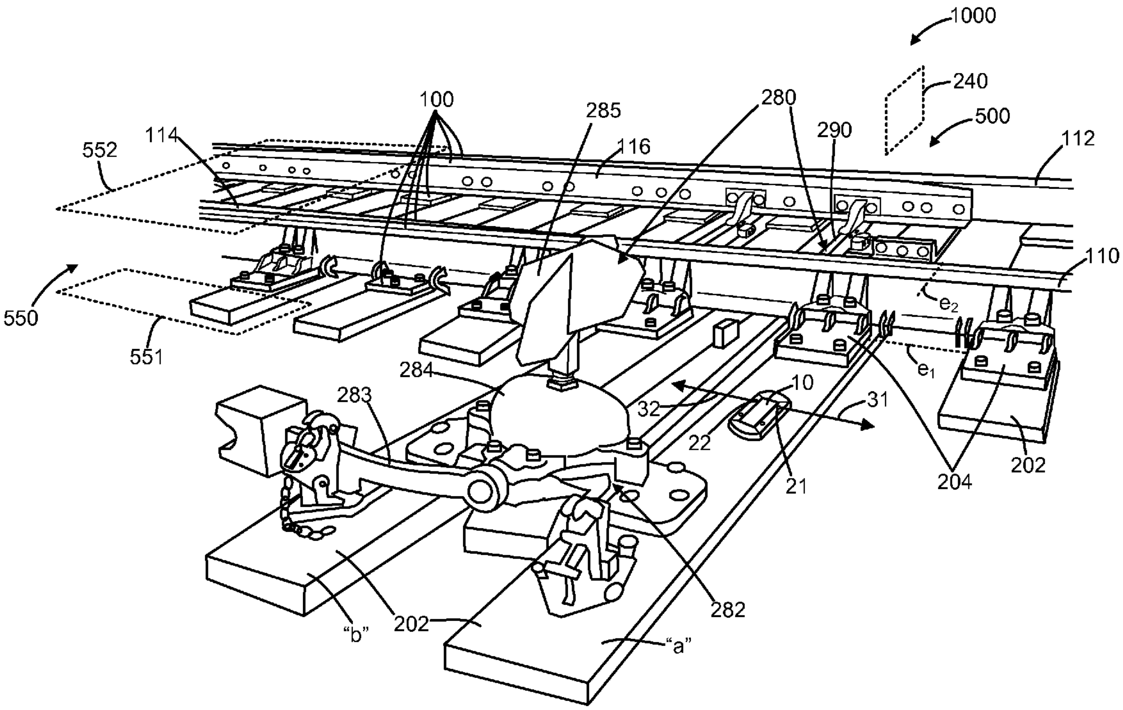
FIG. 2 is a perspective view of an illumination system for highlighting a location of a railway switch.

One arrangement for disposal of illumination unit 10 is shown in FIGS. 1-5. In the embodiment of FIGS. 1-5, illumination unit 10 is operative for illumination of a railway feature in the form of a switch 280. Referring to FIGS. 1 and 2, a switch typically can comprise a part (component) disposed externally to a rail assembly 100 which is commonly referred to as a switchstand 282 and a part (component) disposed internally relative to a rail assembly 100. A part of switch 280 disposed internally relative to a rail assembly 100 can include a linkage member 290 for imparting forces to moveable rails 114 and 116. Moveable rails 114 and 116 can have tapered ends to allow engagement of train wheels. Switchstand 282 (which can also be termed a ground throw or "points lever assembly") can include a lever 283, a linkage box 284, and a directional indicator 285 typically having a vertically extending member as shown in the embodiment of FIG. 1-5.

Regarding switch 280, switch 280 as is illustrated in FIG. 1 can provide switching between a primary railroad track 200, a secondary railroad track 300 and a through railroad track 400, all of which can be regarded as constituent elements of a railway 500 which can include numerous other constituent elements other than the ones specifically noted. A rail assembly 100 of railway 500 can comprise rails forming primary track 200, secondary track 300, and through track 400 as well as additional optional elements such as rail footers 204 for support of rails 110, 112, 114, 116.

Referring to FIG. 1, rail assembly 100 can comprise rail 110 forming part of and partially defining primary track 200 and through track 400, rail 112 partially defining track 200 and track 300, rail 114 partially defining track 200 when switch 280 is in a switched position and track 116 partially defining track 200 and track 400 when switch 280 is in a primary position. Regarding rails 110, 112, 114, 116, rails 110, 112, 114, 116 can be supported on a series of ties 202 which can comprise normal length ties and extended length ties. Extended length ties, e.g., at locations "a" and "b" as shown in FIG. 2. Extended length ties of ties 202 can be provided for support of switch 280. In one example, the "area of a switch" as referred to herein can comprise the area about the extended length ties supporting switch 280 together with N (e.g., N=5) adjacent ties on either side of the extended length ties. Regarding switch 280, switch 280 can be switchable between a primary position in which a traveling train can be routed from the primary track 200 to the through track 400 and a switched position in which a traveling train can be routed from the primary track 200 to the secondary track 300. In one example both primary track 200 and through track 400 as well as their respective rails can be substantially straight. In another example, through track 400 as well as secondary track 300 can be curved relative to primary track 200. In another example, one of secondary track 300 and through track 400 can be curved. Notwithstanding because of curve radius requirements of a curved track, each of rails 110, 112, 114, 116 can be regarded as being substantially straight in an area of switch 280, or another location of interest.

Referring to specific features of a railway 500, e.g., railway 500 can include a series of ties 202 and rails 110, 112, 114, 116. Ties 202 are typically arranged in substantially parallel arrangement with respect to each adjacent tie (for forming a curved track portion, adjacent ties can be disposed at a slight angle relative to a parallel). Ties 202 can be spaced to a nominal centerline to centerline spacing of about 53.34 cm (21.00 inch). The series of ties can support a set of rails. In one embodiment where rail assembly 100 does not include footers 204, ties 202 can directly support rails, e.g., two or more of rails 110, 112, 114, 116. In another embodiment where a rail assembly 100 includes a system of rail footers 204, ties 202 can support rails 110, 112, 114, 116 by way of transferring ground forces through footers 204. Regarding footers 204, footers 204 can range in height from about 0.95 cm to 2.54 cm (about ⅜ in. to 1 in.).

Rails 110, 112, 114, 116 can comprise steel and can be disposed at spaced apart positions on ties and be supported by ties 202 at a position transverse to ties 202. A nominal spacing (gauge) of rails 110, 112, 114, 116 can be 143.5 cm (4 ft, 8½ inch), in one example. Within an area of switch 280, a set of adjacent ties 202 can be extended beyond their normal length for support of components making up switch 280. Ties 202 at locations "a" and "b" of FIG. 2 are extended length ties. Supported on extended length ties 202 at locations "a" and "b" in the embodiment of FIG. 2 are a switchstand 282 which can include lever 283, a linkage box 284, and a directional indicator 285. Typically, ties 202 comprise wood, e.g., hardwood or softwood and can be treated with creosote or other wood preservative. Ties 202 can also comprise pre-stressed concrete. In one example, ties 202 can include a nominal length of 259.08 cm (102.00 inch), a nominal width of 22.86 cm (9.00 inch), a nominal height of 17.78 cm (7.00 inch), a nominal centerline to centerline spacing of 53.34 cm (21.00 inch) and a nominal gap of 30.48 cm (12.00 inch). Dimensions and spacing of ties 202 can vary from the above nominal values. In one example extended length ties for support of a switchstand can have a length of about 381.00 cm (150.00 inch) to provide a platform on which switchstand 282 can be mounted.

In the field, accidents have been observed that result from poor illumination (in known systems illumination can consist of ambient illumination only and/or flashlight illumination) of various railway features. Railways have been observed to be notoriously poorly illuminated including in remote areas outside of commercial centers and industrialized areas that are characterized by street light illumination and illumination from buildings in the vicinity of a railway. Railway features that have been observed to pose a risk to personnel servicing railways are switch components, for example, switch levers have been reported to impale personnel, and tracks which, in some instances, can be so poorly illuminated that personnel have been observed to ascertain the presence of a rail only when walking upon the rail. One railway feature which has been observed to be a significant source of injury is a switchstand 282 of a railway switch. A lever 283 and direction indicator 285 of a switch 280 normally comprise extending and pointed structures which can pose significant risk of injury to persons servicing a railway.

Referring to further aspects of system 1000, illumination unit 10 can be disposed in specific arrangement in relation to switch 280, for highlighting a location of switch 280 in the field, and therefore highlighting the location of dangerous objects such a lever 283 and directional indicator 285. In the development of system 1000 in one embodiment, it was determined that significant advantage can be yielded by configuring system 1000 to substantially illuminate a railroad rail in the area of switch 280. In one embodiment system 1000, with reference to the use case of FIG. 2 can be configured to direct emitted light so that a rail, e.g., rail 110 opposing switchstand 282 is substantially illuminated.

One reason why it is advantageous to direct emitted light for illumination of a railway rail is that railway rails tend to comprise metallic and naturally reflective surfaces. Accordingly, by directing light toward a rail, system 1000 tends to magnify an output of visible illumination output by system 1000. Because railway rails are pre-existing in a railway, the illumination magnification can be yielded without addition of extraneous components into system 1000. Increasing a visible light energy output of system 1000 without increasing an energy input of system 1000 is particularly advantageous in view of the fact that there can be considerable restraints on an amount of energy input available for input into system 1000. In one embodiment, illumination unit 10 can include a solar panel 30 and can rely on solar energy for energy input. In another aspect system 1000 can be implemented in regions away from the equator with minimal available solar energy, particularly during the winter months. Where a railway rails e.g., rail 110 is illuminated in an area of a switch, a location of a switch 280 can be highlighted for a service personnel. From a distance, the rail can have the appearance of an elongated shiny bar to a service personnel.

For illumination of a railway rail, particularly useful for highlighting a location of a railway feature such as a switch 280, system 1000 can be particularly configured. Aspects of system 1000 configuring system 1000 for directing light for illumination of a rail such as rail 110 is described with reference to FIGS. 2 and 5. It is seen that rail assembly 100 of system 1000 can be disposed at certain elevation, the certain elevation being an elevation range (a set of heights) delimited by a bottom of footers 204, $e_1$, and a top of rails 110, 112, 114, 116, $e_2$, in the exemplary embodiment. Where assembly 100 is devoid of footers 204, the certain elevation can be the elevation range delimited by the bottoms and tops of rails 110, 112, 114, 116. Over a wide area, a railway can have gradient changes. In an area of switch 280, because of railway gradient requirements, an elevation of footers 204 and rails 110, 112, 114, 116 can be substantially constant. In another aspect, rails 110, 112, 114, 116 in the area of switch 280 can be regarded to define a substantially horizontally extending planar region, the substantially horizontally extending planar region 550 having a bottom plane 551 delimited by the respective bottom of footers 204, and a top plane 552 delimited by respective tops of rails 110, 112, 114, 116. Where rail assembly 100 is devoid of footers 204 and rails 110, 112, 114, 116 are disposed directly on ties 202, the planar region 550 can be delimited by the bottoms of any two or more rails 110, 112, 114, 116 and a top plane 552 can be delimited by the tops of any two or more rails 110, 112, 114, 116. Designated by planes 551 and 552 it is understood that planar region 550 extends through the area depicted in FIG. 2 (fragments of planes 551, 552 are shown, but are expanded infinitely to define the planar region 550 described).

Figure 3:
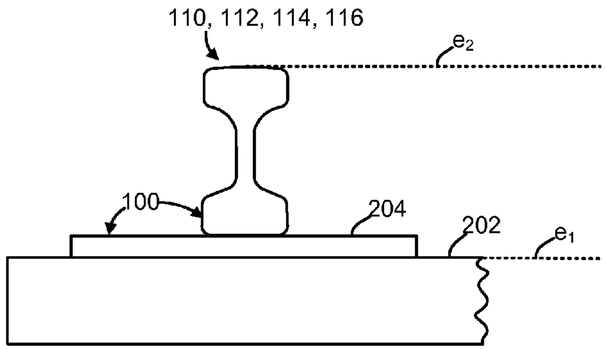
FIG. 3 is a cross sectional view of a railway assembly comprising a footer and a rail, the railway assembly being supported on a plurality of ties.
Figure 4:
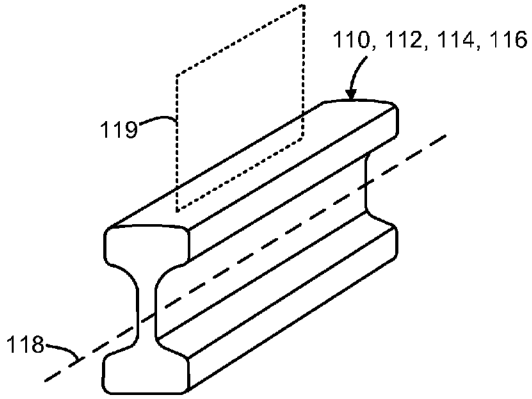
FIG. 4 is a perspective view of a section of an elongated rail having a horizontal axis.

A cross-sectional view of rails 110, 112, 114, 116 is shown in FIG. 3. Certain elevation of a rail assembly 100 can be a set of heights delimited by a bottom of footer 204, $e_1$, and a top of rails 110, 112, 114, 116, $e_2$. Where footer 204 is deleted, a rail assembly 100 can be at a certain elevation delimited by a bottom and top of rail 110, 112, 114, 116. A perspective view of a length of a rail 110, 112, 114, 116 is shown in FIG. 4. A rail 110, 112, 114, 116 can have a horizontal axis 118. A vertically extending plane 119 (a fragment of which is shown in FIG. 4) extending through horizontal axis 118 can have the relative orientation to a rail 110, 112, 114, 116 as shown in FIG. 4.

In one aspect for directing light toward rail, e.g., rail 110, illumination unit 10 can include a light source bank 20 having one or more light sources disposed at certain elevation and within the substantially planar region, e.g., light source 21, and/or light sources 22, 23, 24, 25, 26, as will be described herein.

Figure 6:
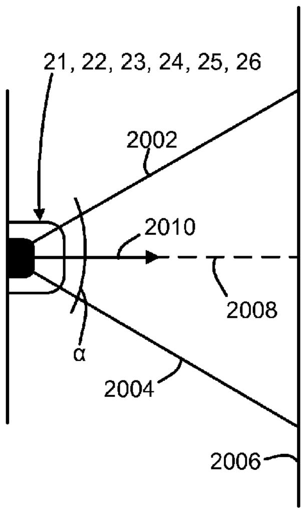
FIG. 6 is a side view of a light source having a central emission vector and a beam angle.

As shown in FIG. 6, a light source described herein, e.g., light source 21, and/or light sources 22, 23, 24, 25, 26 can include a beam angle, $\alpha$, defined for a light source emitting light nominally symmetrically by nominal boundaries 2002, 2004, delimiting points on a target plane 2006 normal to a nominal beam axis 2008 at which luminous intensity is half of a maximum value. A light source 21, 22, 23, 24, 25, 26 can include a central emission vector generically labeled 2010 in the view of FIG. 6, which can extend in an emission direction along nominal axis 2008 of light source 21, 22, 23, 24, 25, 26. Beam angle, $\alpha$, can define an illumination cone of light source 21, 22, 23, 24, 25, 26. In one embodiment, beam angle, $\alpha$, can be 30 degrees. In another embodiment, beam angle, $\alpha$, can be 45 degrees. In another embodiment, beam angle, $\alpha$, can be 60 degrees. In the example of FIG. 6, light source 21, 22, 23, 24, 25, 26 has a symmetrical emission pattern. An emission pattern of light source 21, 22, 23, 24, 25, 26 can also be asymmetrical.

Figure 5:
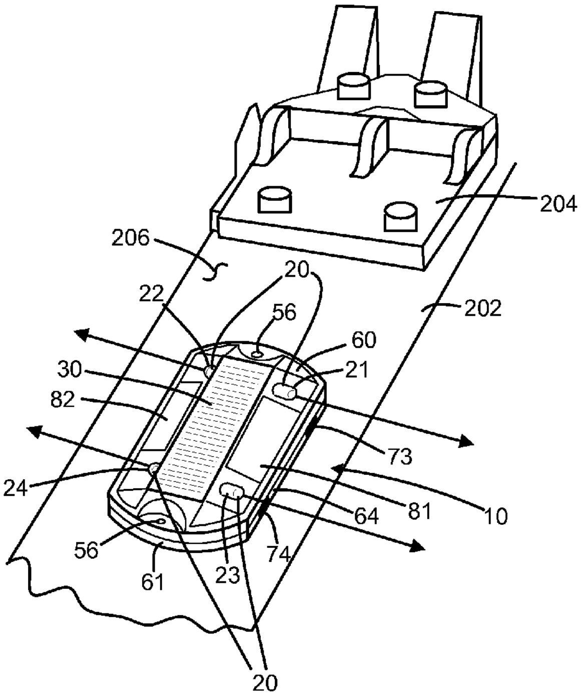
FIG. 5 is a perspective view illustrating an installation of an illumination unit in one embodiment.

Further regarding illumination unit 10, housing 60 can include mounting holes 56 allowing unit 10 to be installed directly on a tie with use of set screws (not shown). In another aspect as is illustrated in FIGS. 2 and 5, system 1000 can be configured so that a central emission vector 31, 32, 33, 34, 35, 36 of one or more light sources 21, 22, 23, 24, 25, 26, extends substantially horizontally substantially at the certain elevation within the substantially planar region 250. In one embodiment, the central emission vector(s) can extend substantially horizontally at the certain elevation. In such manner, light emitted by illumination unit 10 can be directed toward a rail 110 for illumination of rail 110 and a highlighting of a location of switch 280. In the embodiment of FIG. 1, illumination unit 10 can be mounted on extended length tie 202 at location "a" at a location intermediate of switchstand 282 and rail 110. Because rail assembly 100 is disposed adjacently above ties 202, a disposal of illumination unit 10 also adjacently above a tie 202 positions an illumination source of unit 100 at the certain elevation and within planar region 250 where it is well positioned for illumination of one or more railway rail.

In another aspect, light source bank 20 of unit 10 can have a first at least one light source 21 with a central emission vector 31 extending in a first direction and a second at least one light source 22 with a central emission vector 32 extending in a second direction. In another embodiment, unit 10 can have a single light source, e.g., light source 21. In the arrangement shown in FIG. 2, a first one light source 21 having a central emission vector 31 extends a first direction for primarily illuminating rail 110 while a second light source 22 with a central emission vector 32 extends in a second direction for primarily illuminating rail 110 and switchstand 282 of switch 280.

More specifically, there can be defined by the railway 500 a first vertically extending plane 240 extending perpendicularly relative to a horizontal axis of rail 110 through a center of switchstand 282, which can be regarded as the center of the linkage box 284 in the specifically shown embodiment. System 1000 can be configured so that the illumination unit 10 is disposed in a position adjacent to and spaced apart from the first vertically extending plane 240, wherein the illumination unit 10 includes a first light source 21 having a central emission vector 31 extending in first direction and a second light source 22 having a central emission vector 32 extending in a second direction, wherein the first direction is a direction away from a first vertically extending plane 240, wherein the second direction is a direction toward the first vertically extending plane 240. A fragment of plane 240 is shown in FIG. 2, but it is understood that plane 240 extends infinitely.

It has been described that a light source, e.g., light source 21 can substantially illuminate a railway rail where central emission vector 31 of light source 21 extends substantially horizontal and to the certain elevation of the rail assembly including the rail. For increasing an illumination of a rail, e.g., rail 110, light source 21 can be oriented so that central emission vector 31 is directed substantially perpendicularly to and substantially perpendicularly intersects a vertically extending plane extending through a horizontal axis rail 110. However, the embodiment as shown in FIG. 2 will also substantially illuminate a rail 110 where central emission vector 31 extends substantially parallel to a vertically extending plane extending through a horizontal axis of rail 110 where light emitted by light source 21 exhibits a beam radius defining an illumination cone (e.g., 30 degrees, 45 degrees, 60 degrees). A substantial percentage of light rays will reach rail 110 where central emission vector 31 extends in a direction substantially parallel to vertically extending plane extending through a horizontal axis of rail 110. With a central emission vector 31 extending in a direction substantially parallel to a vertical plane extending through a horizontal axis of rail 110, light source 21 is positioned so as to be optimally be visible to an operator a distance away from light source 21 and in a path of natural approach of an operator to a switch 280. (Operators tend to approach a switch by walking on or near a set of railway ties.)

In the particular embodiment described where rail assembly 100 includes footers 204, and where illumination unit 10 has a height of about 3 cm, a central emission vector of a light source of illumination unit 10 can extend horizontally and can have an elevation of about 1.5 cm above the elevation $e_1$. In such embodiment, a central emission vector 31 can extend substantially horizontally at the particular elevation of footer 204 where footer 204 has a height greater than about 1.5 cm.

Where a central emission vector 31 extends substantially horizontally at the certain elevation of footer 204, illumination of footer 204 can be yielded which can guide an operator to a location of a switch. Footers 204, like rails 110, 112, 114, 116 are naturally reflective and metallic, and furthermore, include a plurality of sharp edges which can be particularly reflective and metallic. For increasing an illumination of a rail, illumination unit 10 can be positioned so that central emission vector is at a certain elevation of a rail, e.g., 110. With a partial illumination unit 10 in one embodiment having a height of 3 cm and where a rail assembly includes footers of heights greater than about 1.5 cm, such position can include a spacer (not shown) disposed on a bottom of housing 60 increasing a height of light source central emission vector 31.

Regarding illumination unit 10, illumination unit 10 can include a light source 23 having a central emission vector 33 extending substantially parallel to central emission vector 31, and light source 24 having a central emission vector 34 extending in a direct substantially parallel to emission vector 32.

In a still further aspect, illumination unit 10 can include light source 25 having central emission vector 35 and/or light source 26 having central emission vector 36. Light source 25 and/or light source 26 can replace or supplement light source 21. Illumination unit 10 can also or alternatively comprise one or more of light sources 23, 24 as set forth herein. Illumination unit 10 can be configured so that central emission vectors 31 and 32 extend substantially parallel to a vertical plane extending through a horizontal axis of rail 110. The central emission vectors 35, 36 of light sources 25, 26 can extend substantially horizontally and substantially at the certain elevation of rail assembly 100. Emission vector 35 can be directed toward rail assembly 100 and substantially perpendicularly intersect a plane extending vertically through a horizontal axis rail 110, and emission vector 36 can be directed away from rail assembly 100 and can substantially perpendicularly intersect a switchstand plane extending vertically through switchstand 282, the switchstand plane being substantially parallel to a plane extending vertically through a horizontal axis. System 1000 can be configured so that light rays emitted from light source 26 impinge on switchstand 282. System 1000 can be configured so that light rays emitted from light sources 21, 22, 23, 24, 25, impinge on rail 110 to illuminate rail 110 in an area of switchstand 282.

With such arrangements, rail 110 and switchstand 282 are substantially illuminated. The illumination of rail 110 usefully illuminates an area about switch 280 and thereby highlights a location of switch 280.

Figure 7:
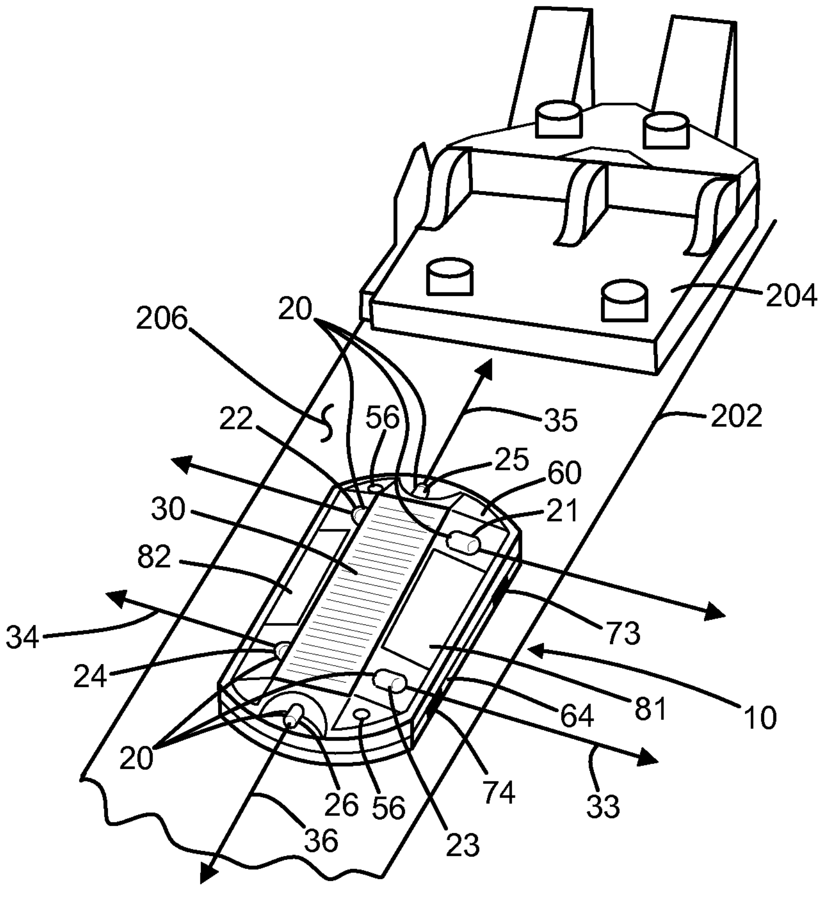
FIG. 7 is a perspective view illustrating an installation of an illumination unit in one embodiment.
Figure 8:
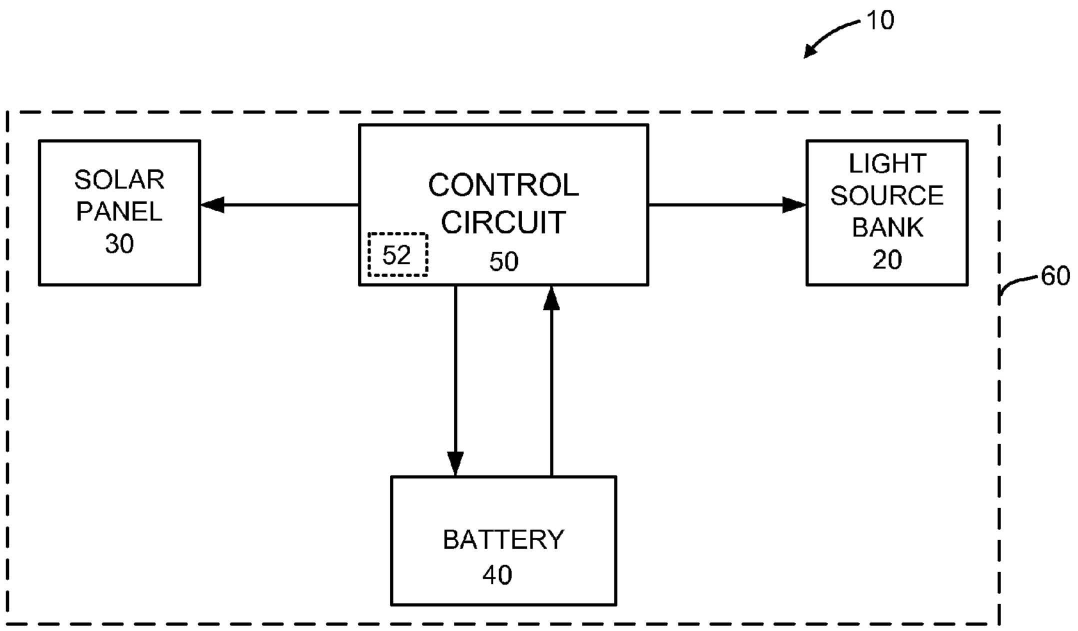
FIG. 8 is a block diagram of an illumination unit in one embodiment.

Referring to FIG. 8 a block diagram of illumination unit 10 is shown and described. Illumination unit 10 can include a solar panel 30, a light source bank 20, a rechargeable battery 40, and a control circuit 50. Control circuit 50 can be switchable between a first mode in which energy collected from solar panel 30 is utilized for the recharging of rechargeable battery 40 and a second mode in which energy stored in rechargeable battery 40 is utilized for the energization of light source bank 20. In one embodiment, control circuit 50 includes a timer 52 for controlling the switching of the modes. The timer 52 can include a real time clock which controls the on time of the second mode depending on the expected duration of nighttime based on the current day of the calendar year. In another embodiment, control circuit 50 can control the switching between the modes based on an output of the solar panel 30. Illumination unit 10 can be operative so that if an output of solar panel 30 indicates a lack of sunlight control circuit 50 switches to the second mode so that energy stored in battery 40 energizes light source bank 20. In another aspect as best seen in FIG. 7, illumination unit 10 can include reflectors 81, 82 for reflecting light, e.g., light from a flashlight.

In another aspect, system 1000 can be configured to be ruggedly constructed and durable notwithstanding significant exposure to various environmental effects, including precipitation events such as rain, snow, and frost. In the development of system 1000 it was determined that while disposal of illumination unit 10 on a railway tie is advantageous for a variety of reasons (e.g., for positioning of the illumination unit for directing light toward a rail), such disposal also can present challenges.

Unlike paved roads for motor vehicles which are required to be graded for precipitation runoff, railway ties 202 can be ungraded and can have substantially flat top surfaces. Also, a top surface of a railway tie 202, typically comprising timber, e.g., hardwood or softwood can be substantially porous. For the above reasons, railway ties 202 can be particularly susceptible to pooling of precipitation. A pooling of precipitation can frustrate operation of an internal component of illumination unit 10, reducing or preventing a capacity of illumination unit 10 to illuminate a railway feature.

Figure 9:
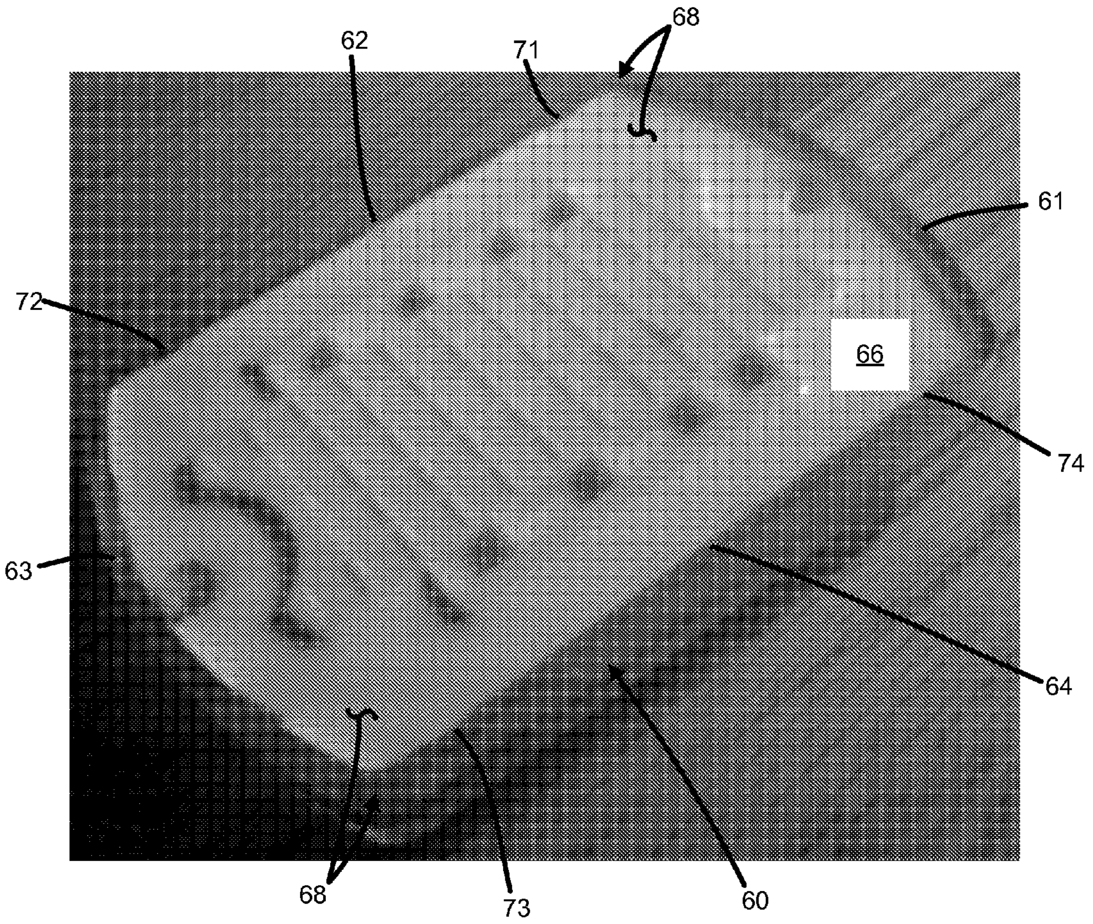
FIG. 9 is perspective bottom view of an illumination unit in one embodiment wherein the illumination unit has a housing including downwardly extending formations that define a raised bottom portion of a bottom of the housing.
Figure 10:
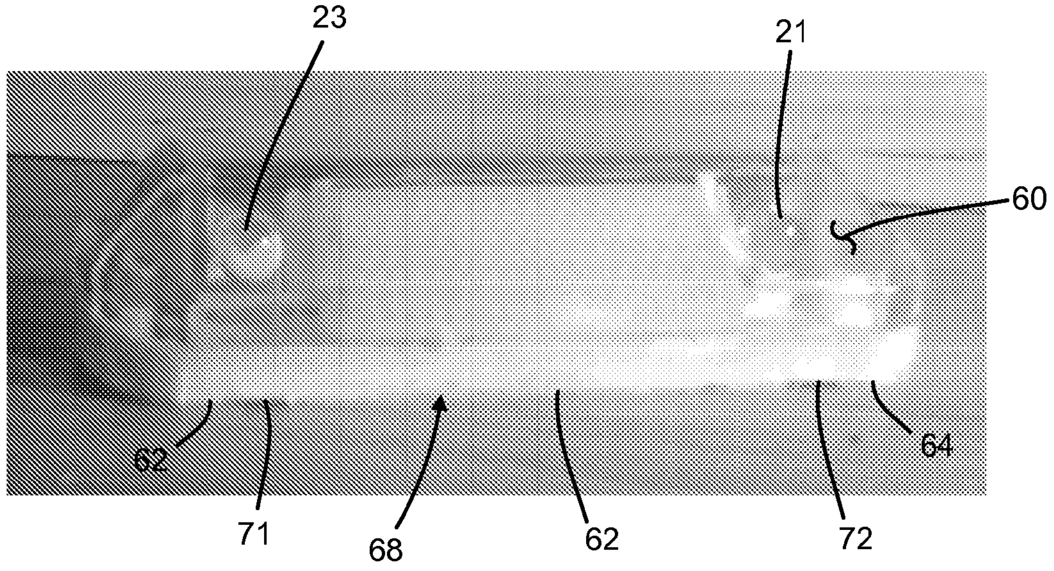
FIG. 10 is a front view of an illumination unit in one embodiment wherein the illumination unit has a housing including downwardly extending formations that define a raised bottom portion of a bottom of the housing.

In one embodiment, illumination unit 10 can be configured and arranged so that a pooling of precipitation is reduced. In one embodiment illumination unit 10 includes a housing 60 that houses the light source bank 20 and the rechargeable battery 40. As indicated in FIGS. 9 and 10, housing 60 can have a plurality of downwardly extending formations 61, 62, 63, 64 extending downwardly from a housing major body to define a raised portion 66 of bottom 68. In the embodiment shown, downwardly extending formations 61, 62, 63, 64 extend downward from a periphery of housing 60, so that periphery of bottom 68 is defined by formations 61, 62, 63, 64 and further so that a raised portion 66 of bottom 68 is defined is a raised interior portion 66 of bottom 68. In one embodiment as best seen in FIG. 10 a housing 60 can comprise clear material, e.g. clear polycarbonate which encapsulates light sources 21, 23 in such manner that light sources are visible from both front perspective view of illumination unit 10 as shown in FIG. 10 and from a side perspective view (not shown). By such design, light from a light source e.g. light source 21, 23 can be viewed from wide range of perspectives. Light rays from a certain light source e.g. light source 21, 23 can be transmitted by unit 10 over an entire angular emission ray of the certain light source. The providing of illumination unit 10 to include raised portion 66 encourages removal of precipitation from an area of illumination unit 10. The providing of illumination unit 10 to include raised portion 66 also encourages airflow about illumination unit 10, thereby removing moisture from an interior and an exterior of illumination unit, and further regulating a temperature of illumination unit 10. Regulating a temperature of illumination unit 10 can improve a performance of internal electrical components of illumination unit 10. The providing illumination unit 10 to include raised portion 66 also allows an area for liquids to expand on freezing thereby increasing a securing force by which illumination unit 10 can be secured to a tie 202, and reducing stresses on illumination unit 10.

Referring to the installation view of FIG. 5, extended length tie 202 at location “a” can include a top surface 206 and the illumination unit 10 can be installed on the extended length tie 202 at location “a” so that the plurality of downwardly extending formations 61, 62, 63, 64 impart a compression force on the top surface 206, the downwardly extending formations 61, 62, 63, 64 defining a clearance between the raised portion 66 of bottom 68 and the top surface 206 when the illumination unit is installed on the extended length tie 202 so that it contacts top surface 206 of extended length tie 202 at location “a.” In one embodiment, raised portion 66 of bottom 68 can be raised about 0.3 cm from an elevation of the bottom of formations 61, 62, 63, 64.

Further referring to the installation view of FIG. 5, the downwardly extending formations 61, 62, 63, 64 can extend downwardly from a periphery of the housing 60, to define weep channels 71, 72, 73, 74 that are substantially smaller in dimension than formations 61, 62, 63, 64. The positioning of downward extending formations about the periphery of housing 60 operates to direct precipitation away from illumination unit 10. Specification details of illumination unit 10 in one embodiment are summarized in Table A.

TABLE A

| | |
|---|---|
| Manufacturer | Ninghan Quinghai Electrical of Ningbo, Zhejiang, Peoples Republic of China |
| Model No. | QH-011D |
| Light Source | Super luminosity LED |
| Light Output | Varying type/Constant Type |
| Solar Panel | Poly-crystalline silicon/Single crystalline silicon |
| Run Time | 108 hours for Varying type/More than 24 hours for Constant type |
| Battery | NI-MH/Super Capacitor |
| Housing | Polycarbonate |
| Work Temperature | −25 to 75 degrees C. |
| Load Rating | 40,000 lbs. |
| Reflectors | 2 |
| Environmental Rating | Waterproof |
| Dimensions | 11 cm × 8 cm × 3 cm |
| Central Emission Vector | Elevation 1.5 cm, horizontal relative to bottom of housing |

In another embodiment, illumination unit 10 can be provided by the illumination unit as summarized in Table B. Illumination unit 10 can also be provided by another model (solar light) available from Ninghan Quinghai Electrical or another manufacturer.

TABLE B

| | |
|---|---|
| Manufacturer | Ninghan Quinghai Electrical of Ningbo, Zhejiang, Peoples Republic of China |
| Model No. | Custom-Based on QH-011D |
| Light Source | 4 LED-8 mm |
| Light Output | 4 lumen |
| Solar Panel | Single crystalline silicon |
| Run Time | 20 hour minimum on full charge |
| Battery | Nickel-metal hydride-700 mAH |
| Housing | Polycarbonate-clear |
| Body Melt Temp | 374 degrees F. |

TABLE B-continued

| | |
|---|---|
| Load Rating | 40,000 lbs. |
| Reflectors | 2 |
| Environmental Rating | Waterproof |
| Dimensions | 11 cm × 8 cm × 3 cm |
| Central Emission Vector | Elevation 1.5 cm, horizontal relative to bottom of housing |

In another embodiment, illumination unit 10 can be provided by a commercially available solar light of one of the models mentioned modified to include a raised bottom portion and downwardly extending formations as set forth herein or another model modified to include a raised bottom portion and downwardly extending formations as set forth herein. Table C sets forth an embodiment including downwardly extending formations as set forth herein.

TABLE C

| | |
|---|---|
| Manufacturer | Ninghan Quinghai Electrical of Ningbo, Zhejiang, Peoples Republic of China |
| Model No. | Custom-Based on QH-011D |
| Light Source | Super luminosity LED |
| Light Output | Varying type/Constant Type |
| Solar Panel | Mono-crystalline silicon |
| Run Time | 70+ constant hours for white and yellow, 27+ for Purple |
| Battery | NiMH 2000 mAH |
| Housing | Polycarbonate |
| Work Temperature Range | −25 to 75 degrees C. |
| Load Rating | 8 Tons |
| Reflectors | 2 |
| Environmental Rating | Waterproof to IP 67 |
| Dimensions | 11 cm × 8 cm × 3 cm, 0.5 × 0.2 cm. Weep channels (2 on each of front & back) as shown in FIGS. 5 and 6. Centers of weep holes spaced 6.7 cm |
| Central Emission Vector | Elevation 1.5 cm, horizontal relative to bottom of housing |

Manufacturers of solar lights often provide assistance in manufacturing custom units. One such manufacturer is Ninghan Quinghai Electrical of Ningbo, Zhejiang, Peoples Republic of China. In a number of embodiments of illumination unit 10 set forth herein there can be a light source bank 20 having a first light source and M additional units, M=>0. Various embodiments of illumination unit 10 are set forth herein with six light sources, for example. In one embodiment, the M additional light sources can have a common emission wavelength relative to the first light source and can be controlled according to a common control with the first light source. In one embodiment the M additional light sources can have different emission wavelengths relative to an emission wavelength of the first light source, and can be controlled according to control methods different than a control for the first light source.

In another aspect illumination unit 10 can be utilized to illuminate locations of interest of railway 500 other than switch 280.

Figure 11:
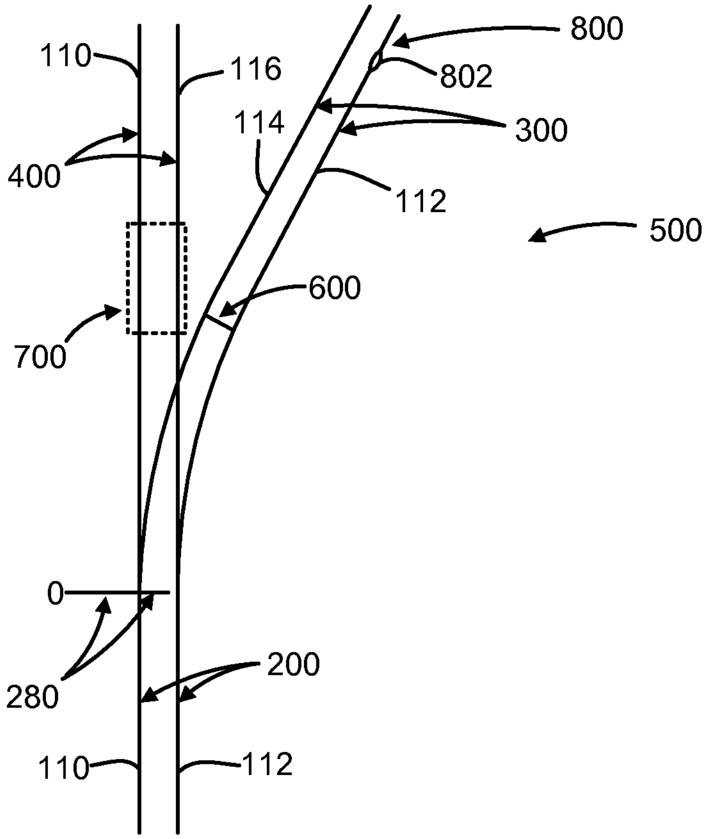
FIG. 11 is a top view of a railway having a switch, a foul point, and a derail point.

Referring to FIG. 1, railway 500 can include a foul point 600 and a derail point 800. A foul point 600 can be regarded as a point on a railway 500 beyond which a car must travel on secondary track 300 so as to avoid interference with a stationary or moving car on a through track 400. Location of interest in the form of switch 280, foul point 600, and the derail point 800 are also shown in a top view of FIG. 11. If a car on track 300 is located between foul point 600 and through track 400, it can interfere with stationary or moving car 700 (as shown in FIG. 11) of through track 400 potentially causing significant property damage and injury. A foul point can be a specific point in a length of track, e.g., track 300. A foul point can be indicated by a line running transverse to a set of rails, e.g., rails 114, 112. A foul point can be associated to a specific tie 202, the tie on which a foul point is located. A tie at which a foul point is located can be regarded as a foul point tie, e.g., tie 202 at location "c" of FIG. 12 herein. An "area of a foul point" herein can refer to the area about a foul point as well as N ties (e.g., N=5) laterally on either side of a foul point. In currently available railways, foul points have been observed to be highlighted with paint (e.g. a painted tie and rails at the foul point). In the development of system 1000 it was observed that indicating paint for indicating a foul point tends to fade or chip. Also, it was noted that such indicating paint tends to become obscured and not highly visible or visible at all when covered by debris, snow or rail cars.

Figure 13:
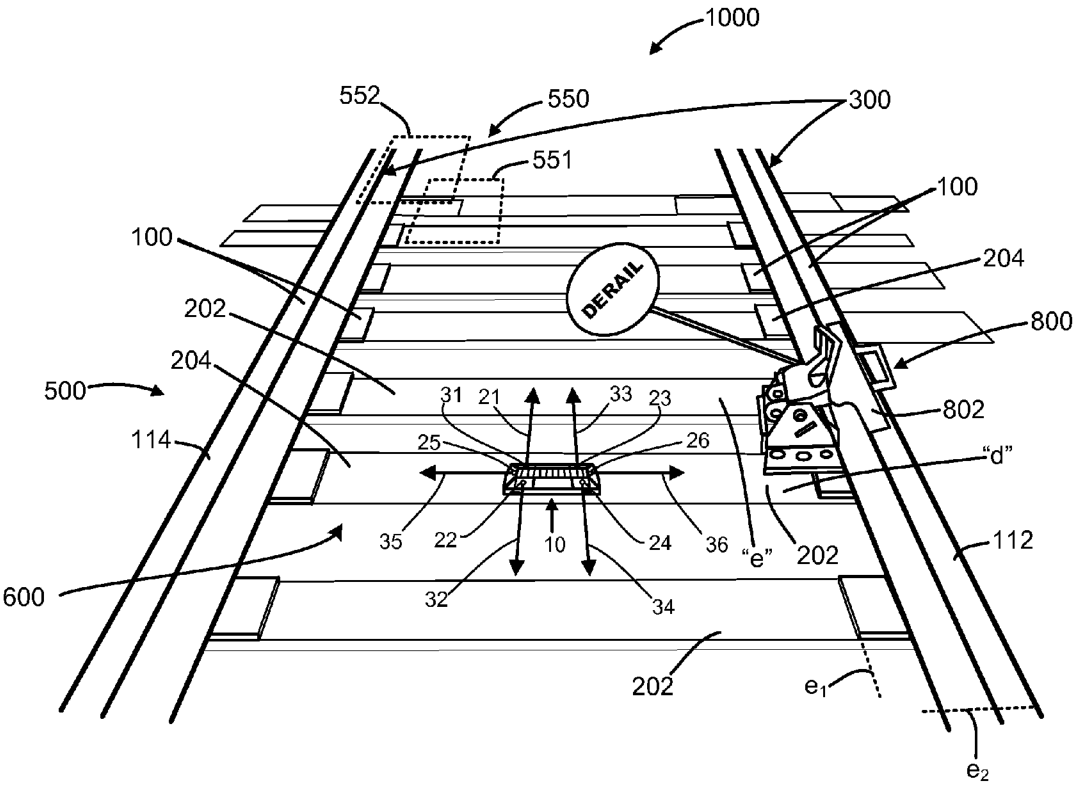
FIG. 13 is a perspective view of a system for illuminating a railway feature, wherein there is provided an illumination unit for illumination of a derail point.

A derail point of track 300 is a point where a derailer 802 is located. A derailer 802 is shown in FIG. 13. Derailer 802 can be moveable from an active position (shown in the view) to an inactive position in which a car can move past the derail point without being derailed. In the example shown, derailer 802 can be partially supported by tie 202 at location "d" and by tie 202 at location "e." If a car moved past a derail point 800 with a derailer in an active position, a car will be derailed. An "area of a derail point" herein can refer to the area about a derailer 802 (which can be regarded as a derail location) as well as N ties (e.g., N=5) laterally on either side of a derail point.

Figure 12:
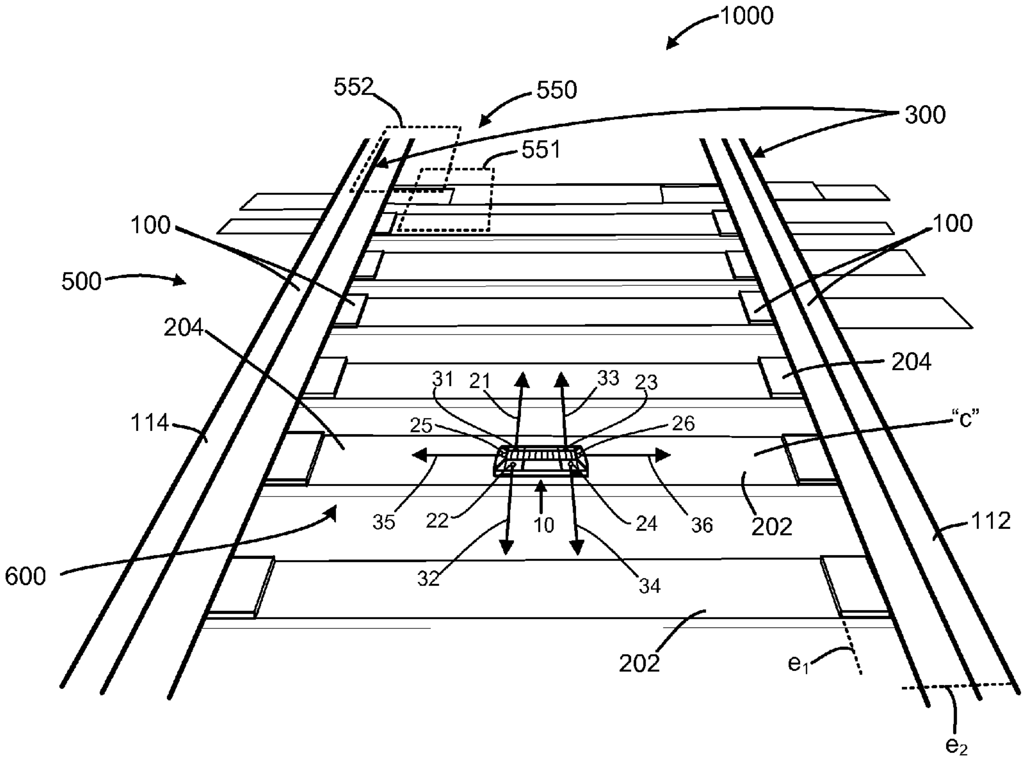
FIG. 12 is a perspective view of a system for illumination of a railway feature, wherein there is provided an illumination unit for illumination of a foul point.

An illumination unit 10 can be disposed as shown in FIG. 12 for highlighting of a foul point 600. Illumination unit 10 in the embodiment of FIG. 12 is shown as having a light source bank 20 comprising six light sources (in an alternative embodiment one to five of the light sources can be deleted). Each of light sources 21, 22, 23, 24, 25, 26 can have a central emission vector extending substantially horizontally and substantially at a central elevation of rail assembly 100 delimited in the instance shown by a bottom of footer 204, $e_1$, and a top of rail 114, 112, $e_2$, which can define a planar region 550 as described with reference to FIG. 12 can be delimited by bottom plane 551 and top plane 552. In one embodiment, one or more central emission vectors 31, 32, 33, 34, 35, 36 can extend at a certain elevation. In the embodiment of FIG. 12 central emission vectors 31, 33 of light sources 21, 23 extend in first and second directions that are substantially parallel to a vertical plane extending through a length of rails 114, 112 while central emission vectors 32, 34 as shown in extend in second and third directions opposite respectively the first and second. Vectors 31, 33 extend rearward along track 300 while vectors 32, 34 extend forward along track 300. Central emission vector 35 of light source 25 can extend in a direction substantially perpendicular to and substantially perpendicular intersecting a vertical plane extending through a horizontal axis of rail 114 while central emission vector 36 of light source 26 can extend in a direction substantially perpendicular to and substantially perpendicular intersecting vertical plane extending through a horizontal axis of rail 112. Central emission vector 36 can extend in a direction parallel to a certain tie 202 that can define a foul point. Illumination unit 10 in the embodiment of FIG. 12 is shown as being supported directly on tie 202. Illumination unit 10 can be in accordance with Tables A, B, C, and/or another specification with additional light sources added. Light sources 21, 23 can illuminate rails and footers (or rails and not footers in the case footers are deleted) in the manner of a light source illuminating rails 110 and footers described in reference to FIG. 2 while being projected to be visible from a long range (e.g., 50M plus) from an approaching operator who may be approaching by walking on ties or adjacent to ties). Light source 25 can primarily illuminate rail 114 in the area of a foul point 600 while light source 26 can primarily illuminate rail 112 in an area of foul point 600. With reference to the embodiment of FIG. 12, light sources 21-25 can emit light rays impinging on rail 114, while light sources 21-24, 26 can emit light rays impinging on rail 112.

An illumination unit 10 can be disposed as shown in FIG. 13 for highlighting of a derail point 800, which can be regarded as the point of traveling on which a car can be derailed by derailer 802. Illumination unit 10 in the embodiment of FIG. 13 is as shown having six light sources (in an alternative embodiment one to five of the light sources can be deleted). Each of light sources 21, 22, 23, 24, 25, 26 can have a central emission vector extending substantially horizontally and substantially at a certain elevation of rail assembly 100 delimited in the instance shown by a bottom of footer 204, $e_1$, and a top of rail, $e_2$, 114, 112 which limiting elements define in the same manner as described with reference to FIG. 2 a planar region 550 as described in reference to FIG. 2. In one embodiment, central emission vectors 31, 32, 33, 34, 35, 36 substantially extend horizontally at the certain elevation. In the embodiment of FIG. 13 central emission vectors 31, 33 of light sources 31, 33 extend in first and second directions that are parallel to a vertical plane extending through a horizontal axis of rail 114 while central emission vectors 32, 34 of light sources 22, 24 extend in second and third directions opposite respectively the first and second. Vectors 31, 33 extend rearward along track 300 and vectors 32, 34 extend forwardly along track 300. Central emission vector 35 of light source 25 can extend in a direction substantially perpendicular to and substantially perpendicular by intersecting a vertical plane extending through a horizontal axis of rail 114 while central emission vector 36 of light source 26 can extend in a direction substantially perpendicular to and substantially perpendicular by intersecting a vertical plane extending through a horizontal axis of rail 112. Central emission vector 36 can extend in a direction substantially parallel to a certain tie 202 at location "d" that supports derailer 802 as shown in FIG. 13. Illumination unit 10 in the embodiment of FIG. 13 is shown as being supported directly on tie 202 supporting derailer 802 at a location between rail 114 and rail 112. Illumination unit 10 can be provided in accordance with Tables A, B, or C, or in accordance with another specification with additional light sources added. Light sources 21, 22, 23, 24 illuminate rails 112, 116 and footers 204 (or rails and not footers in the case footers are deleted) in the manner of a illumination unit 10 illuminating rail 110 and footers 204 as described in reference to FIG. 2 while being projected to be visible from a long range (e.g., 50M plus) from an approaching operator who may be approaching by walking on ties or adjacent to ties. Light source 25 can primarily illuminate rail 114 in an area of a derailing point 800 while light source 26 can primarily illuminate rail 112 as well as derailer 802 in an area of a derail point. With reference to the embodiment of FIG. 13, light sources 21-25 can emit light rays that impinge on rail 114, while light sources 21-24, 26 can emit light rays impinging on rail 112. Light source 26 can emit light rays impinging on derailer 802.

Railway 500 particularly in remote areas can be exceedingly dark and void of light in the nighttime. A problem that was noted in the development of system 1000 was that even if points of interest are indicated with use of illumination unit 10 it may be difficult to distinguish between various points of interest. In system 1000 different lighting profiles can be utilized to highlight different locations of interest to facilitate an operator distinguishing between different locations of interest (i.e., whether a location of interest is a switch or a foul point or a derail point). The different lighting profiles can include different emission wavelengths (i.e., colors). The different lighting profiles can alternatively or additionally include different illumination controls (e.g., flashing on and off, intensity varying).

Table D indicates various illumination profiles that can be utilized to highlight different locations of interest. In one embodiment, system 1000 can be configured so that each light source of an illumination unit 10 can have a common illumination profile.

TABLE D

| Location of interest | Embodiment 1 | Embodiment 2 | Embodiment 3 | Embodiment 4 |
|---|---|---|---|---|
| Switch | White (Constantly Energized) | White (Constantly Energized) | White (Constantly Energized) | White (Constantly Energized) |
| Foul Point | Yellow (Constantly Energized) | Yellow (Constantly Energized) | Yellow (Constantly Energized) | Yellow (Constantly Energized) |
| Derail Point | White (Flashing) | Purple (Constantly Energized) | Orange (Flashing) | Orange (Constantly Energized) |

In embodiments described herein, there is described a single illumination unit 10 provided for illuminating a single location of interest. However, it is understood that a plurality of illumination units 10 can be provided for illuminating a particular location of interest. In the development of system 1000 it was determined that confusion to service personnel can ensue if the illumination profile of various illumination units 10 of system 1000 are not coordinated and are not carefully selected. As noted, illumination units 10 for highlighting of different locations of interest can be differentiated from one another so that service personnel can distinguish different locations of interest from a distance. Also, an illumination unit 10 can have an illumination profile selected so as not to cause confusion with other information that can be presented in a railway environment. In one embodiment, illumination units 10 of system 1000 can be devoid of light sources that emit light in any of the red or orange or green wavelength bands for illuminating a railway feature. In development of system 1000 it was determined that use of red light relative to railway 500 can indicate a stop prompt (e.g. that a person or train must stop). Accordingly, avoiding use of red light avoids presentation of potentially confusing information relative to railway 500. Likewise "green" in a railway environment can indicate a "go" prompt. Accordingly, avoiding use of green light avoids presentation of potentially confusing information. In some embodiments, it can be useful to utilize red and/or green light for illuminating a railway feature.

In one embodiment, substantially parallel herein refers to angles less than 30 degrees from parallel. In one embodiment, substantially parallel herein refers to angles less than 20 degrees from parallel. In one embodiment, substantially parallel herein refers to angles less than 10 degrees from parallel. In one embodiment substantially parallel herein refers to angles less than 5 degrees from parallel. In one embodiment, substantially parallel herein refers to angles less than 2 degrees from parallel. In one embodiment, substantially perpendicular (substantially perpendicularly) herein refers to angles less than 30 degrees from perpendicular. In one embodiment, substantially perpendicular herein refers to angles less than 20 degrees from perpendicular. In one embodiment, substantially perpendicular herein refers to angles less than 10 degrees from perpendicular. In one embodiment substantially perpendicular herein refers to angles less than 5 degrees from perpendicular. In one embodiment, substantially perpendicular herein refers to angles less than 2 degrees from perpendicular.

A small sample of systems methods and apparatus that are described herein is as follows:

A1. A system for illumination of a feature of a railway, the railway including a railroad track having plurality of ties, the plurality of ties including an extended length tie, and a switch for switching a route of a traveling train, the switch being switchable between a primary position in which a traveling train can be routed from a primary track to a through track, and a switched position in which a traveling train can be routed from a primary track to a secondary track, the switch having a switchstand component supported on the extended length tie, the railway having a rail assembly supported on the plurality of ties, the rail assembly having first and second elongated rails, wherein the rail assembly is supported at a certain elevation, wherein the system comprises:

an illumination unit supported on the extended length tie in an area of the extended length tie between the first rail and the switch component, the illumination unit having a light source bank, the light source bank including a first light source that comprises a central emission vector extending in a first direction that is substantially horizontal and at the certain elevation; and wherein the illumination unit includes a solar panel for collecting solar energy, and a rechargeable battery, the rechargeable battery for energizing the light source bank and being rechargeable utilizing solar energy collected by the solar panel.

A2. The system of A1, wherein the system is configured so that central emission vector of the first light source extends in a direction that is substantially parallel with a vertical plane extending through a horizontal axis of the first rail.

A3. The system of A1, wherein the illumination unit comprises a second light source, the second light source having a central emission vector that extends in a direction that is substantially horizontal and that is substantially at the certain elevation.

A4. The system of A1, wherein the illumination unit comprises a second light source, the second light source having a central emission vector that extends in a second direction that is substantially horizontal and that is substantially at the certain elevation, the second direction being substantially parallel to a vertical plane extending through a horizontal axis of the first rail.

A5. The system of A1, wherein the system is configured so that the illumination unit is disposed in a position adjacent to and spaced apart from a first vertically extending plane extending substantially perpendicularly relative to the first rail and through a center of the switchstand, wherein the illumination unit includes a second light source having a central emission vector extending in a second direction, wherein the first direction is a direction away from the first vertically extending plane, wherein the second direction is a direction toward the first vertically extending plane.

A6. The system of A1, wherein the illumination unit includes a housing that houses the light source bank and the rechargeable battery, the housing having a plurality of downwardly extending formations extending downwardly from the housing to define a housing bottom having a raised bottom portion, wherein the extended length tie includes a top surface, the illumination unit being installed on the extended length tie so that the plurality of downwardly extending formations impart a compression force on the top surface, the downwardly extending formations defining a clearance between the raised bottom portion and the top surface when the illumination unit is installed on the extended length tie.

A7. The system of A6, wherein the downwardly extending formations extend downwardly from a periphery of the housing.

A8. The system of A6, wherein the downwardly extending formations extend downwardly from a periphery of the housing to define weep channels about a periphery of the housing.

A9. The system of A1, wherein the first and second rails delimit a substantially horizontally extending planar region having a top delimited by the tops of the first and second rails and a bottom delimited by the bottoms of the rail assembly, wherein the first light source is disposed within the substantially horizontally extending planar region.

A10. The system of A1, wherein the central emission vector of the first light source extends in a direction that substantially perpendicularly intersects a vertically extending plane extending through a horizontal axis of the first rail.

B1. A system for illumination of a feature of a railway, the railway including a railroad track having plurality of ties including an extended length tie, the switch being switchable between a primary position in which a traveling train can be routed from a primary track to a through track, and a switched position in which a traveling train can be routed from a primary track to a secondary track, the switch having a switchstand component supported on the extended length tie, the railway having a rail assembly supported on the plurality of ties, the rail assembly having first and second elongated rails, wherein the rail assembly is supported at a certain elevation, wherein the system comprises:

an illumination unit supported on a tie of the plurality of ties at a location proximate the switch, the illumination unit having a light source bank, the light source bank including a first light source that comprises a central emission vector, the illumination unit being supported so that the central emission vector extends in a first direction that is substantially horizontal and at the certain elevation; and wherein the illumination unit includes a solar panel for collecting solar energy and a rechargeable battery, the illumination unit being configured so that the rechargeable battery is operative for energizing the light source bank, the illumination unit further being configured so that the rechargeable battery is rechargeable utilizing solar energy collected by the solar panel.

B2. The system of B1, wherein the illumination unit is supported on the elongated length tie.

B3. The system of B1, wherein the illumination unit is supported on the extended length tie at a location externally disposed relative to the first rail and internally disposed relative to the switch component.

B4. The system of B1, wherein the illumination unit is supported on a plurality of ties.

B5. The system of B1, wherein the switch includes a linkage member and wherein the illumination unit is supported at a location that is more proximate the switchstand component than the rail link member.

B6. The system of B1, wherein the central emission vector of the first light source extends in a direction that is substantially parallel to a vertical plane extending through a horizontal axis of the first rail, and wherein the illumination unit includes a second light source, the second light source having a central emission vector extending in a direction that is substantially perpendicular to the plane extending through a horizontal axis of the first rail.

C1. A method for illuminating a feature of a railway, the railway including a railroad track having plurality of ties, the railway having a rail assembly supported on the plurality of ties, the rail assembly having first and second elongated rails, wherein the rail assembly is supported at a certain elevation, wherein the method comprises:

providing an illumination unit that includes a light source bank, a solar panel for collecting solar energy, and a rechargeable battery, the illumination unit being configured so that the rechargeable battery is operative for energizing the light source bank, the illumination unit further being configured so that the rechargeable battery is rechargeable utilizing solar energy collected by the solar panel;

installing the illumination unit so that the light source bank is disposed at the certain elevation.

D1. A method for illuminating a feature of a railway, the railway including a railroad track having plurality of ties, the railway having a rail assembly supported on the plurality of ties, the rail assembly having first and second elongated rails, wherein the rail assembly is supported at a certain elevation, wherein the system comprises:

providing an illumination unit that includes a light source bank having a first light source, a solar panel for collecting solar energy and a rechargeable battery, the illumination unit being configured so that the rechargeable battery is operative for energizing the light source bank, the illumination unit further being configured so that the rechargeable battery is rechargeable utilizing solar energy collected by the solar panel;

installing the illumination unit so that a central emission vector of the first light source extends substantially horizontally at the certain elevation.

D2. The method of D1, wherein the providing includes providing the illumination unit to include a second light source having a central emission vector that extends in a direction substantially perpendicular to a vertical plane extending through the central emission vector of the first light source and wherein the installing step includes the step of installing the illumination unit so that the central emission vector of the second light source extends in a direction that substantially perpendicularly intersects a vertically extending plane extending through a horizontal axis of the first rail.

D3. The method of D1, wherein the providing includes providing the illumination unit so that the light source bank includes a second light source having a central emission vector that extends in a direction substantially perpendicular to a vertical plane extending through the central emission vector of the first light source and wherein the installing step includes the step of installing the illumination unit in an area of a switch so that the central emission vector of the second light source extends in a direction that substantially perpendicularly intersects a vertically extending plane extending through a switchstand of the switch in a direction that is substantially parallel to a vertically extending plane extending through a horizontal axis of the first rail.

E1. An illumination unit comprising:

a light source bank;

a solar panel for collecting solar energy;

a rechargeable battery;

wherein the illumination unit is switchable between a first mode in which solar energy collected by the solar panel is utilized for recharging the rechargeable battery; and a second mode in which stored energy stored within rechargeable battery is utilized for energizing the light source bank;

a housing that houses the solar panel, the light source bank, and the rechargeable battery, the housing having a downward extending formation extending downwardly from a periphery of the housing, the downwardly extending formation defining a raised interior portion of a bottom of the housing, a periphery of the bottom of the housing being defined by the downward extending formation.

E2. An illumination unit of E1, wherein the housing has a plurality of downward extending formations defining a periphery of a bottom of the housing, the plurality of downward extending formations defining a raised interior portion of the bottom, and further defining weep channels of the housing.

F1. A system for illuminating a feature of a railway, the railway including a railroad track having a plurality of ties, the railway having a rail assembly supported on the plurality of ties, the system comprising:

a first illumination unit for illuminating a first location of interest, an area about the first location of interest including a rail assembly having a certain elevation, the first illumination unit having a first light source disposed at the certain elevation, wherein the first illumination unit is switchable between a first mode in which solar energy collected by the solar panel is utilized for recharging the rechargeable battery, and a second mode in which stored energy stored within a rechargeable battery is utilized for energizing the light source bank;

a second illumination unit for illuminating a second location of interest, an area about the second location of interest including a rail assembly having a certain elevation, the second illumination unit having a first light source disposed at the certain elevation, wherein the first illumination unit is switchable between a first mode in which solar energy collected by the solar panel is utilized for recharging the rechargeable battery, and a second mode in which stored energy stored within rechargeable battery is utilized for energizing the light source bank;

wherein the first location of interest and the second location of interest are of different types, and wherein each of the first location of interest and the second location of interest is a location of interest selected from the group consisting of a switch, a foul point, and derail point; and wherein the first light source of the first illumination unit has a first illumination profile and the first light source of the second illumination unit has a second illumination profile, the second illumination profile being different from the first illumination profile.

F2. The system of F1, wherein the first illumination profile and the second illumination profile are differentiated by a wavelength of emission.

F3. The system of F1, wherein the first illumination profile and the second illumination profile are differentiated by illumination control the first illumination profile being characterized by a constantly energized illumination control, the second illumination profile being characterized by a flashing illumination control.

F4. The system of F1, wherein the first location of interest is a switch and the second location of interest is a foul point.

F5. The system of F1, wherein the first location of interest is a switch and the second location of interest is a foul point.

F6. The system of F1, wherein a central emission vector of the first light source of the first illumination unit extends substantially horizontally in a direction substantially parallel to plane extending through a horizontal axis of a rail in an area of the first location of interest.

F7. The system of F1, wherein the system includes a third illumination unit for illuminating a third location of interest, an area about the third location of interest including a rail assembly having a certain elevation, the third illumination unit having a light source bank including a first light source disposed at the certain elevation, wherein the third illumination unit is switchable between a first mode in which solar energy collected by the solar panel is utilized for recharging the rechargeable battery, and a second mode in which stored energy stored within rechargeable battery is utilized for energizing the light source bank, wherein the first location of interest and the second location of interest and the third location of interest are of different types, and wherein each of the first location of interest and the second location of interest and the third location of interest is a location of interest selected from the group consisting of a switch, a foul point, and derail point, and wherein the first light source of the first illumination unit and the first light source of the second illumination unit and wherein the first illumination unit of the third illumination unit have different illumination profiles.

G1. A system for illumination of a feature of a railway, the railway including a railroad track having plurality of ties, the railway having a rail assembly supported on the plurality of ties, the rail assembly having first and second elongated rails in an area of a foul point, wherein the rail assembly is supported at a certain elevation, wherein the system comprises:

an illumination unit supported on a tie of the plurality of ties in the area of the foul point, the illumination unit having a light source bank, the light source bank including a first light source that emits light having a central emission vector, the illumination unit being supported so that the central emission vector extends in a first direction that is substantially horizontal and at the certain elevation; and wherein the illumination unit includes a solar panel for collecting solar energy and a rechargeable battery, the illumination unit being configured so that the rechargeable battery is operative for energizing the light source bank, the illumination unit further being configured so that the rechargeable battery is rechargeable utilizing solar energy collected by the solar panel.

G2. The system of G1, wherein the tie on which the illumination unit is supported is a foul point tie.

G3. The system of G1, wherein illumination unit is supported at position of the tie intermediate of the first and second rail.

G4. The system of G1, wherein the central emission vector extends in a direction substantially parallel to a vertically extending plane extending through a horizontal axis of the first rail.

G5. The system of G1, wherein illumination unit is supported at a position of the tie intermediate of the first and second rail, wherein the illumination unit includes first, second, third, fourth, fifth and sixth light sources with first, second, third, fourth, fifth, and sixth central emission vectors, the first and second central emission vectors extending in rearward directions that are substantially parallel to a vertical plane extending through a horizontal axis of the first rail, the third and fourth central emission vectors extending in forward directions that are substantially parallel to a vertical plane extending through a horizontal axis of the first rail, the fifth central emission vector extending in a direction that substantially perpendicularly intersects a vertically extending plane extending through a horizontal axis of the first rail, the sixth central emission vector extending in a direction that substantially perpendicularly intersects a vertically extending plane extending through a horizontal axis of the second rail.

H1. A system for illumination of a feature of a railway, the railway including a railroad track having plurality of ties, the railway having a rail assembly supported on the plurality of ties, the rail assembly having first and second elongated rails in an area of a derail point defined by a derailer, wherein the rail assembly is supported at a certain elevation, wherein the system comprises:

an illumination unit supported on a tie of the plurality of ties in the area of the derail point, the illumination unit having a light source bank, the light source bank including a first light source that emits light having a central emission vector, the illumination unit being supported so that the central emission vector extends in a first direction that is substantially horizontal and at the certain elevation; and wherein the illumination unit includes a solar panel for collecting solar energy and a rechargeable battery, the illumination unit being configured so that the rechargeable battery is operative for energizing the light source bank, the illumination unit further being configured so that the rechargeable battery is rechargeable utilizing solar energy collected by the solar panel.

H2. The system of H1, wherein the tie on which the illumination unit is supported is tie supporting a derailer.

H3. The system of H1, wherein illumination unit is supported at a position of the tie intermediate of the first and second rail.

H4. The system of H1, wherein the central emission vector extends in a direction substantially parallel to a vertically extending plane extending through a horizontal axis of the first rail.

H5. The system of H1, wherein illumination unit is supported at a position of the tie intermediate of the first and second rail, wherein the illumination unit includes first, second, and third light sources with first, second, third central emission vectors, the first central emission vector extending in a rearward direction that is substantially parallel to a vertical plane extending through a horizontal axis of the first rail, the second central emission vectors extending in a forward direction that is substantially parallel to a vertical plane extending through a horizontal axis of the first rail, the third light source emitting light rays impinging on a derailer.

While the present application has been described with reference to a number of specific embodiments, it will be understood that the true spirit and scope of the application should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been set forth, it will be understood that features and aspects that have been described with reference to each particular embodiment can be used with each remaining particularly set forth embodiment.

The invention claimed is:

1. A system for illumination of a feature of a railway, the railway including a railroad track having plurality of ties, the plurality of ties including an extended length tie, and a switch for switching a route of a traveling train, the switch being switchable between a primary position in which a traveling train can be routed from a primary track to a through track, and a switched position in which a traveling train can be routed from a primary track to a secondary track, the switch having a switchstand component supported on the extended length tie, the railway having a rail assembly supported on the plurality of ties, the rail assembly having first and second elongated rails, wherein the rail assembly is supported at a certain elevation, wherein the system comprises:

an illumination unit supported on the extended length tie in an area of the extended length tie between the first rail and the switch component, the illumination unit having a light source bank, the light source bank including a first light source that comprises a central emission vector extending in a first direction that is substantially horizontal and at the certain elevation; and wherein the illumination unit includes a solar panel for collecting solar energy, and a rechargeable battery, the rechargeable battery for energizing the light source bank and being rechargeable utilizing solar energy collected by the solar panel.

2. The system of claim 1, wherein the system is configured so that central emission vector of the first light source extends in a direction that is substantially parallel with a vertical plane extending through a horizontal axis of the first rail.

3. The system of claim 1, wherein the illumination unit comprises a second light source, the second light source having a central emission vector that extends in a direction that is substantially horizontal and that is substantially at the certain elevation.

4. The system of claim 1, wherein the illumination unit comprises a second light source, the second light source having a central emission vector that extends in a second direction that is substantially horizontal and that is substantially at the certain elevation, the second direction being substantially parallel to a vertical plane extending through a horizontal axis of the first rail.

5. The system of claim 1, wherein the system is configured so that the illumination unit is disposed in a position adjacent to and spaced apart from a first vertically extending plane extending substantially perpendicularly relative to the first rail and through a center of the switchstand, wherein the illumination unit includes a second light source having a central emission vector extending in a second direction, wherein the first direction is a direction away from the first vertically extending plane, wherein the second direction is a direction toward the first vertically extending plane.

6. The system of claim 1, wherein the illumination unit includes a housing that houses the light source bank and the rechargeable battery, the housing having a plurality of downwardly extending formations extending downwardly from the housing to define a housing bottom having a raised bottom portion, wherein the extended length tie includes a top surface, the illumination unit being installed on the extended length tie so that the plurality of downwardly extending formations impart a compression force on the top surface, the downwardly extending formations defining a clearance between the raised bottom portion and the top surface when the illumination unit is installed on the extended length tie.

7. The system of claim 6, wherein the downwardly extending formations extend downwardly from a periphery of the housing.

8. The system of claim 6, wherein the downwardly extending formations extend downwardly from a periphery of the housing to define weep channels about a periphery of the housing.

9. The system of claim 1, wherein the first and second rails delimit a substantially horizontally extending planar region having a top delimited by the tops of the first and second rails and a bottom delimited by the bottoms of the rail assembly, wherein the first light source is disposed within the substantially horizontally extending planar region.

10. The system of claim 1, wherein the central emission vector of the first light source extends in a direction that substantially perpendicularly intersects a vertically extending plane extending through a horizontal axis of the first rail.

11. A system for illumination of a feature of a railway, the railway including a railroad track having plurality of ties including an extended length tie, a switch being switchable between a primary position in which a traveling train can be routed from a primary track to a through track, and a switched position in which a traveling train can be routed from a primary track to a secondary track, the switch having a switchstand component supported on the extended length tie, the railway having a rail assembly supported on the plurality of ties, the rail assembly having first and second elongated rails, wherein the rail assembly is supported at a certain elevation, wherein the system comprises:

an illumination unit supported on a tie of the plurality of ties at a location proximate the switch, the illumination unit having a light source bank, the light source bank including a first light source that comprises a central emission vector, the illumination unit being supported so that the central emission vector extends in a first direction that is substantially horizontal and at the certain elevation; and wherein the illumination unit includes a solar panel for collecting solar energy and a rechargeable battery, the illumination unit being configured so that the rechargeable battery is operative for energizing the light source bank, the illumination unit further being configured so that the rechargeable battery is rechargeable utilizing solar energy collected by the solar panel.

12. The system of claim 11, wherein the illumination unit is supported on the extended length tie at a location externally disposed relative to the first rail and internally disposed relative to the switchstand component.

13. The system of claim 11, wherein the switch includes a linkage member and wherein the illumination unit is supported at a location that is more proximate the switchstand component than the linkage member.

14. The system of claim 11, wherein the central emission vector of the first light source extends in a direction that is substantially parallel to a vertical plane extending through a horizontal axis of the first rail, and wherein the illumination unit includes a second light source, the second light source having a central emission vector extending in a direction that is substantially perpendicular to the plane extending through a horizontal axis of the first rail.

15. A system for illumination of a feature of a railway, the railway including a railroad track having plurality of ties, the railway having a rail assembly supported on the plurality of ties, the rail assembly having first and second elongated rails in an area of a foul point, wherein the rail assembly is supported at a certain elevation, wherein the system comprises:

an illumination unit supported on a tie of the plurality of ties in the area of the foul point, the illumination unit having a light source bank, the light source bank including a first light source that emits light having a central emission vector, the illumination unit being supported so that the central emission vector extends in a first direction that is substantially horizontal and at the certain elevation; and wherein the illumination unit includes a solar panel for collecting solar energy and a rechargeable battery, the illumination unit being configured so that the rechargeable battery is operative for energizing the light source bank, the illumination unit further being configured so that the rechargeable battery is rechargeable utilizing solar energy collected by the solar panel.

16. The system of claim 15, wherein the tie on which the illumination unit is supported is a foul point tie.

17. The system of claim 15, wherein illumination unit is supported at position of the tie intermediate of the first and second rail.

18. The system of claim 15, wherein the central emission vector extends in a direction substantially parallel to a vertically extending plane extending through a horizontal axis of the first rail.

19. The system of claim 15, wherein illumination unit is supported at a position of the tie intermediate of the first and second rail, wherein the illumination unit includes first, second, third, fourth, fifth and sixth light sources with first, second, third, fourth, fifth, and sixth central emission vectors, the first and second central emission vectors extending in rearward directions that are substantially parallel to a vertical plane extending through a horizontal axis of the first rail, the third and fourth central emission vectors extending in forward directions that are substantially parallel to a vertical plane extending through a horizontal axis of the first rail, the fifth central emission vector extending in a direction that substantially perpendicularly intersects a vertically extending plane extending through a horizontal axis of the first rail, the sixth central emission vector extending in a direction that substantially perpendicularly intersects a vertically extending plane extending through a horizontal axis of the second rail.

20. A system for illumination of a feature of a railway, the railway including a railroad track having plurality of ties, the railway having a rail assembly supported on the plurality of ties, the rail assembly having first and second elongated rails in an area of a derail point defined by a derailer, wherein the rail assembly is supported at a certain elevation, wherein the system comprises:

an illumination unit supported on a tie of the plurality of ties in the area of the derail point, the illumination unit having a light source bank, the light source bank including a first light source that emits light having a central emission vector, the illumination unit being supported so that the central emission vector extends in a first direction that is substantially horizontal and at the certain elevation; and wherein the illumination unit includes a solar panel for collecting solar energy and a rechargeable battery, the illumination unit being configured so that the rechargeable battery is operative for energizing the light source bank, the illumination unit further being configured so that the rechargeable battery is rechargeable utilizing solar energy collected by the solar panel.

21. The system of claim 20, wherein the tie on which the illumination unit is supported is tie supporting a derailer.

22. The system of claim 20, wherein illumination unit is supported at a position of the tie intermediate of the first and second rail.

23. The system of claim 20, wherein the central emission vector extends in a direction substantially parallel to a vertically extending plane extending through a horizontal axis of the first rail.

24. The system of claim 20, wherein illumination unit is supported at a position of the tie intermediate of the first and second rail, wherein the illumination unit includes first, second, and third light sources with first, second, third central emission vectors, the first central emission vector extending in a rearward direction that is substantially parallel to a vertical plane extending through a horizontal axis of the first rail, the second central emission vectors extending in a forward direction that is substantially parallel to a vertical plane extending through a horizontal axis of the first rail, the third light source emitting light rays impinging on a derailer.

25. A method for illuminating a feature of a railway, the railway including a railroad track having a plurality of ties, the railway having a rail assembly supported on the plurality of ties, the method comprising:

providing a first illumination unit for illuminating a first location of interest, an area about the first location of interest including a rail assembly having a certain elevation, the first illumination unit having a first light source disposed at the certain elevation, wherein the first illumination unit is switchable between a first mode in which solar energy collected by a solar panel of the first illumination unit is utilized for recharging a rechargeable battery of the first illumination unit, and a second mode in which stored energy stored within the rechargeable battery of the first illumination unit is utilized for energizing the first light source of the first illumination unit;

providing a second illumination unit for illuminating a second location of interest, an area about the second location of interest including a rail assembly having a certain elevation, the second illumination unit having a first light source disposed at the certain elevation, wherein the second illumination unit is switchable between a first mode in which solar energy collected by a solar panel of the second illumination unit is utilized for recharging a rechargeable battery of the second illumination unit, and a second mode in which stored energy stored within the rechargeable battery of the second illumination unit is utilized for energizing the first light source of the second illumination unit, wherein the first location of interest and the second location of interest are of different types, and wherein each of the first location of interest and the second location of interest is a location of interest selected from the group consisting of a switch, a foul point, and derail point; and wherein the first light source of the first illumination unit has a first illumination profile and the first light source of the second illumination unit has a second illumination profile, the second illumination profile being different from the first illumination profile;

illuminating the first location of interest utilizing the first illumination unit; and illuminating the second location of interest utilizing the second illumination unit.

26. The method of claim 25, wherein the first illumination profile and the second illumination profile are differentiated by a wavelength of emission.

27. The method of claim 25, wherein the first illumination profile and the second illumination profile are differentiated by illumination control, the first illumination profile being characterized by a constantly energized illumination control.

28. The method of claim 25, wherein the first illumination profile and the second illumination profile are differentiated by illumination control, the first illumination profile being characterized by a constantly energized illumination control, the second illumination profile being characterized by a flashing illumination control.

29. The method of claim 25, wherein the first illumination profile and the second illumination profile are differentiated by a wavelength of emission, and wherein the first illumination profile and the second illumination profile are differentiated by illumination control, the first illumination profile being characterized by a constantly energized illumination control, the second illumination profile being characterized by a flashing illumination control.

30. The method of claim 25, wherein the first location of interest is a switch and the second location of interest is a foul point.

31. The method of claim 25, wherein the first location of interest is a switch and the second location of interest is a derail point.

32. The method of claim 25, wherein a central emission vector of the first light source of the first illumination unit extends substantially horizontally in a direction substantially parallel to a plane extending through a horizontal axis of a rail in an area of the first location of interest.

33. The method of claim 25, wherein the method includes providing a third illumination unit for illuminating a third location of interest, an area about the third location of interest including a rail assembly having a certain elevation, the third illumination unit having a light source bank including a first light source disposed at the certain elevation, wherein the third illumination unit is switchable between a first mode in which solar energy collected by the solar panel is utilized for recharging the rechargeable battery, and a second mode in which stored energy stored within rechargeable battery is utilized for energizing the light source bank, wherein the first location of interest and the second location of interest and the third location of interest are of different types, and wherein each of the first location of interest and the second location of interest and the third location of interest is a location of interest selected from the group consisting of a switch, a foul point, and derail point, and wherein the first light source of the first illumination unit and the first light source of the second illumination unit and wherein the first illumination unit of the third illumination unit have different illumination profiles.

34. The method of claim 33, wherein the first location of interest is a switch, the second location of interest is a foul point, and the third location of interest is a derail point.

35. The method of claim 34, wherein the first location of interest is a switch, the second location of interest is a foul point, and the third location of interest is a derail point, wherein the first illumination profile the second illumination profile and the third illumination profile are differentiated by a wavelength of emission.

36. A railway including a railroad track having a plurality of ties, the railway having a rail assembly supported on the plurality of ties, the railway further comprising:

a first illumination unit for illuminating a first location of interest, an area about the first location of interest including a rail assembly having a certain elevation, the first illumination unit having a first light source disposed at the certain elevation, wherein the first illumination unit is switchable between a first mode in which solar energy collected by a solar panel of the first illumination unit is utilized for recharging a rechargeable battery of the first illumination unit, and a second mode in which stored energy stored within a the rechargeable battery of the first illumination unit is utilized for energizing the first light source of the first illumination unit;

a second illumination unit for illuminating a second location of interest, an area about the second location of interest including a rail assembly having a certain elevation, the second illumination unit having a first light source disposed at the certain elevation, wherein the second illumination unit is switchable between a first mode in which solar energy collected by a solar panel of the second illumination unit is utilized for recharging a rechargeable battery of the second illumination unit, and a second mode in which stored energy stored within the rechargeable battery of the second illumination unit is utilized for energizing the first light source of the second illumination unit;

wherein the first location of interest and the second location of interest are of different types, and wherein each of the first location of interest and the second location of interest is a location of interest selected from the group consisting of a switch, a foul point, and derail point; and wherein the first light source of the first illumination unit has a first illumination profile and the first light source of the second illumination unit has a second illumination profile, the second illumination profile being different from the first illumination profile.

* * * * *